Patented Dec. 15, 1936

2,064,764

UNITED STATES PATENT OFFICE 2,064,764

STENCIL SCREEN

Harry E. Playford and Robert H. Hoge, Huntington, W. Va., and Carroll Cone, Alton, Ill., assignors to Owens-Illinois Glass Company, a corporation of Ohio No Drawing. Application December 20, 1935
Serial No. 55,408

18 Claims. (Cl. 41—38.6)

The present invention relates to gelatin screens and the method of their preparation.

Screens of silk mesh or the like having outlines or designs set out in pervious portions and the remainder of the screen blocked out in impervious portions are used as stencils for transfering paints, ink, enamels or frit to the surfaces of various articles to be designed, including bottles, jars, posters and the like. In the preparation of the conventional gelatin screens, generally referred to as "silk screens" gelatin has been spread over the surface of the screen mesh by hand, with the result that the gelatin was spread unevenly over the screen leaving portions which were thicker than other portions. In the use of screens for stenciling work, the particular thickness of the gelatin is an important factor since the amount of ink deposited on the printing surface is, in general, equal in thickness to the screen itself. This is due to the fact that the squeegee fills to the brim the cavities in the pervious portions of the screen and then, when the screen is removed, the ink will remain on the printing surface. The deeper the cavities are, the greater will be the deposit of ink. Thus, when the gelatin was spread over the screen mesh by hand, leaving portions of the screen thicker than others, the result was that an imperfect, uneven pattern was produced which tended to have varying and inaccurate shades of color and color gradations. Moreover, it took considerable time and much delicate preparation to make a screen by the prior methods.

It is an object of the present invention to provide a gelatin screen which has a uniform depth of gelatin throughout its surface and a method for preparing the same simply and accurately. In view of the fact that the depth of coloring material such as an enamel frit which is to be applied to the surface of a bottle or the like, is of utmost importance in producing the correct shade of color in the bottle after it has been fired, it is an object of the invention to regulate the depth of the gelatin screen throughout its surface to produce predetermined colors, shades and gradations of color.

It is another object to provide a silk screen having a gelatin coating applied in sheet form.

A further object of the present invention is to provide a method for applying to a silk screen mesh a coating of gelatin in a sheet form which has been sensitized with a soluble chromate or dichromate so that the resulting screen has a uniform distribution of sensitizing solution throughout its depth. Screens sensitized by the conventional brushing-on method showed a marked tendency to "wash under"—a term of our own coinage, which may be explained by saying that that side of the gelatinous compound immediately adjacent to the silk washed away to a greater extent than did the outer surface. Upon examination, it appeared as though the outer side of the sheet, or film, to which the solution had been directly applied, had formed into a crust, leaving the inner portions more and more soluble, in direct proportion to the distance from the surface of the treated side. Screens so made had an uneven distribution of chromic oxide crystals and lacked durability since after a few rubbings with a squeegee, the crust would bend or break inward giving rise to ragged edges. It is an object therefore of the present invention to provide a screen having a uniform distribution of congealing pigment such as chromic oxide throughout the gelatin.

It is also within the contemplation of the present invention to provide a curing step in the production of a screen to lengthen its commercial use and to prevent its becoming brittle over a period of time. Other objects and advantages in the invention will become apparent from the following description.

Broadly, the invention contemplates immersing a sheet of gelatin in a sensitizing solution for a period of time until it is thoroughly soaked. When it has become soft and elastic, the screen mesh is immersed in the solution and placed in contact with the gelatin sheet. Preferably the sheet of gelatin is floated over the screen mesh so that the screen mesh may be lifted out of the bath with the sheet of gelatin placed in register thereon. As an alternative, the gelatin may be juxtaposed to the screen by bringing it in contact therewith from below, that is by laying the screen down on top of the gelatin and lifting the two out together. It is now permitted to dry and when the screen has become dry, it may be exposed and developed in the usual manner. After the gelatin screen has been developed and fixed, I provide a curing step to prevent the finished screen from becoming brittle and to prolong its life.

When the silk screen is coated with gelatin containing a soluble chromate or dichromate, and after being dried is exposed to light, chromic-oxide, which combines with the gelatin, is formed by reduction. This product will not swell or dissolve in tepid water as does pure gelatin. Thus, if exposure to light is made through a positive photographic print, the exposed portion will develop a high content of chromic-oxide, while the parts protected from illumination will remain unchanged. Those portions of the gelatin film having chromic-oxide combined therein by the reducing action of the light, will not be washed away or dissolved by the aqueous developing solution, but the unaffected portions will readily dissolve in the water to leave clean, open portions in the screen.

In order to obtain the type of stencil screen contemplated by the present invention, the various steps in the method as hereinafter set forth should be strictly adhered to. The necessary materials for producing this screen are gelatin in sheet form and a silk or other suitable screen mesh, and in the production of this screen the gelatin is utilized in sheet form of a preferable thickness not exceeding .0020 of an inch, and the silk mesh is preferably of the type that is commercially known as a No. 12 full gauze weave. For some types of work wherein a very high detail is required, it may be better to use a No. 14 or No. 16 full gauze weave. Of course, it is to be understood that the specifications of the gelatin and the screen are merely suggestive, and can be varied according to the particular use to which the ultimate product is to be put.

With these essential elements for a start, the silk mesh is mounted upon a frame of any desired size by stretching it taut in all directions and fastening it in position by staples, adhesive, or other suitable means. After being so attached, the silk screen mesh is treated with a sizing solution in order that a bond may be eventually obtained between the silk mesh and the gelatin. This sizing may be any of the ordinary sizers used, as for example, a solution containing 3 grams of pure gelatin and 50 cc. of distilled water. It has been found satisfactory to generously coat the outer surface of the screen with the aid of a camel's hair brush. The excess should be brushed away and the screen permitted to become thoroughly dry.

The next step in the procedure is to take a sheet of gelatin of a size equal to the frame that has been prepared, taking into consideration the possible swelling or spreading which may take place with certain gelatins due to the wetting, and immerse this gelatin in a tray that has been filled with a sensitizing solution such as one containing potassium dichromate, or the like. The sheet of gelatin should be soaked for a short period of time until it has become soft and elastic, and the sensitizing solution has an opportunity to permeate the gelatin, at which time the screen frame is to be immersed in the solution and the silk mesh screen brought into position beneath and in alignment with the sheet of gelatin. Immediately thereafter the combined screen and gelatin are to be removed from the solution and the film gently brushed until a perfectly smooth contact between the sizing on the screen and the gelatin is obtained. All bubbles and irregularities between the gelatin and the sized mesh are to be removed. The juxtaposed gelatin and screen mesh may be removed by floating the gelatin over the screen mesh and then raising the latter out of solution. If the screen is immersed in solution over the gelatin it is possible to remove them in juxtaposition by lifting them from below. Some suitable means may be provided therefor, such as a tray resting at the bottom of the solution and pivoted on the side of the tank so that when lifting the screen out of solution it may be inverted and laid on an adjacent table. The function of the sizing on the screen is to form an excellent bond and enable the gelatin to remain in contact with the silk mesh. When the gelatin has had an opportunity to soak for a short period of time in the liquid until it has become soft and elastic, and then placed face to face with a screen mesh, the soft portions of the gelatin tend to mold themselves around the fibres of the mesh and secure a firm grip. The amount by which the screen mesh sinks into the gelatin may be regulated by regulating the time of soaking of the gelatin in the liquid and more particularly by regulating the subsequent drying temperature. If it becomes too soft, it will be difficult to handle and will tend to tear when brushing it smooth on the mesh.

Before the screen dries it should be placed in a dark room. For the first ten or fifteen minutes the gelatin screen should preferably be allowed to dry naturally, but after this any mechanical means such as a fan may be used to accelerate the drying. The dried screen is now sensitized in such a manner that exposure to the light will harden the gelatin and prevent its being washed away or dissolved.

It is generally desirable to use the sensitized screen as soon as possible after it has been prepared because some gelatin screens, sensitized with a dichromate solution, tend to deteriorate upon lengthy exposure to the atmosphere even in a dark room. The sensitized screen may now be placed in an exposure frame with its gelatin surface facing the glass of said frame, and with a positive print between the gelatin and the glass. The screen should be backed up with a soft dark felt, or with a flat black rubber pad, or other suitable resilient means capable of shutting out illumination. To insure perfect contact between the positive print and the gelatin, by causing all the elements to seat in intimate contact, it is preferable to clamp the backing-up pad into position. The film may now be exposed to a light, preferably of a high candle power such as an arc light of 1,000 watts for about 15 minutes. The exposure time, of course, is to be controlled to suit the design that is being reproduced as one skilled in the art will understand. After the completion of the exposure, the screen should be removed from the exposure frame and then placed with its sensitized surface downward into a tray of distilled water which is preferably at a temperature not to exceed 94° F. Screens should be washed first for two minutes in a cold bath at approximately 70 to 75° to remove excess dichromate solution, then the washing is to be completed in water not to exceed 94° until thoroughly clean. After the screens have been thoroughly washed and dried they may be rewashed safely, if desired, in water up to 120°. After the screen has been soaked in the water it may be exposed to the light without any detrimental effect and thereafter the film may be washed in relatively hot water, as high as 120° F., this being sufficient to carry the washing to final completion. As previously stated in this description, the portions of the sensitized film which have been exposed to illumination will acquire a hardness or solidity that will not be affected by the washing solution, but those portions which have been protected from the light will soften and wash away leaving only the silk mesh screen at these points. Thus, any design in the positive photograph will be transferred to the sensitized gelatin to form a stencil.

In order to make the resulting screen suitable for severe stenciling work, particularly that found in connection with transferring a relatively abrasive frit to the surface of a bottle or the like, we have found it to be of decided advantage to apply a curing process to the gelatin screen. This curing step consists in dipping the gelatin screen in a glycerine and distilled water solution for a period of time approximating 10 seconds. A desirable concentration of the glycerine is about 8 to 10% by volume. The drying of the screen after the dip in the curing solution should be natural for the first few minutes, and thereafter may be accelerated by any desirable means such as a fan. By the inclusion of the curing step the finished screen will not be brittle. If the finished screen has been insufficiently washed it can be washed again, but in that event the curing step should be repeated.

It is to be observed that by means of the present invention we have provided a method by which the exact amount of frit, according to the exacting requirements of a particular job, may be transferred onto the surface to be designed. Particularly in the bottle industry is this vitally important since an incorrect amount of coloring matter on a bottle will cause a variance in the color hue and its translucency. By means of the present invention it is possible to select and use a sheet of gelatin of predetermined thickness to obtain predetermined results and be assured that the thickness of the screen throughout its area will not vary or be inaccurate.

Although we have described our process and gelatin screen in connection with specific procedures, it is to be understood that modifications and variations may be resorted to as those skilled in the art will readily understand. For example, the sheet of gelatin may be placed upon the silk mesh by a slightly modified method in which the sheet of gelatin is laid on a flat surface such as a smooth rubber pad and then, preferably tipped at an angle of, say 45, the sensitizer may be flowed over the gelatin until it begins to stretch. The pad, with the gelatin still in place, is laid face downward on the silk screen mesh which has been coated with a sizing medium. Due to the presence of the gelatin sizing on the screen mesh, the sheet gelatin has greater affinity for the screen than the rubber pad, and, as a result, the rubber pad may easily be removed to leave the sheet gelatin in a smooth layer on the screen. The sheet gelatin should then be brushed gently to an intimate and smooth contact with the silk as heretofore explained. It will be noted that in this modified method as in the method heretofore explained, the sensitizer has been applied to its full optimum concentration on the side juxtaposing the screen mesh. In this manner we have prevented the so-called washing under and permit the unexposed portions of the screen to be washed out cleanly and sharply without undermining the exposed portions.

We claim:

1. The process of preparing a sensitized screen which comprises immersing a sheet of gelatin in a sensitized solution and then immersing a screen mesh underneath said sheet and lifting said gelatin out of the solution in juxtaposition to said screen.

2. The process of preparing a sensitized screen which comprises laying a sheet of gelatin in juxtaposition to a screen mesh while in a liquid, and then removing excess liquid from the screen mesh and gelatin.

3. The process of preparing a sensitized screen which comprises laying a sheet of gelatin in juxtaposition to a screen mesh while in a liquid sensitizing solution, and then removing excess liquid from the screen mesh and gelatin.

4. The process of preparing a sensitized screen which comprises laying a sheet of gelatin in juxtaposition to a screen mesh while in a liquid, and lifting said gelatin and said screen out of solution in juxtaposition.

5. The process of preparing a sensitized screen which comprises laying a sheet of gelatin in juxtaposition to a screen mesh while in a liquid sensitizing solution, and lifting said gelatin and said screen out of solution in juxtaposition.

6. The process of preparing a sensitized screen which comprises immersing a sheet of gelatin in an aqueous bath to soften it, immersing a screen mesh in said bath, laying said screen mesh in juxtaposition to said sheet, and then lifting the said gelatin and said screen out of the bath.

7. The process of preparing a sensitized screen which comprises immersing a sheet of gelatin in a sensitizing bath to soften it, immersing a screen mesh in said bath, laying said screen mesh in juxtaposition to said sheet, and then lifting the said gelatin and said screen out of the bath.

8. The process of preparing a sensitized screen which comprises immersing a sheet of gelatin in a sensitized solution and then immersing a screen mesh underneath said sheet, arranging said gelatin in juxtaposition to and in register with said screen, and lifting said gelatin out of the solution on said screen.

9. The process of preparing a sensitized screen which comprises immersing a sheet of gelatin in a sensitized solution and then immersing a screen mesh underneath said sheet, arranging said gelatin in juxtaposition to and in register with said screen, lifting said gelatin out of the solution on said screen and brushing said gelatin to obtain a smooth contact with said mesh.

10. The process of preparing a sensitized screen which comprises immersing a sheet of gelatin in a sensitized solution and then immersing a screen mesh underneath said sheet, said screen mesh having a size therein to effect a bond between said gelatin and screen mesh, and then lifting said gelatin and screen out of solution in juxtaposition.

11. The process of preparing a sensitized screen which comprises laying a sheet of gelatin in juxtaposition to a screen mesh while in a liquid, said screen mesh having a size therein to effect a bond between said gelatin and screen mesh, and then lifting said gelatin and screen out of solution in juxtaposition.

12. The process of preparing a sensitized screen which comprises laying a sheet of gelatin in juxtaposition to a screen mesh while in a liquid sensitizing solution, said screen mesh having a size therein to effect a bond between said gelatin and screen mesh, and then lifting said gelatin and screen out of solution in juxtaposition.

13. The process of preparing a stenciling screen which comprises laying a sheet of gelatin in juxtaposition to a screen mesh while in a liquid, separating the excess liquid from said screen mesh and the gelatin, removing portions of said gelatin in a predetermined design, and then curing said screen by means of a glycerin solution to increase its life and prevent brittleness.

14. The process of preparing a stenciling screen which comprises laying a sheet of gelatin in juxtaposition to a screen mesh while in a liquid sensitizing solution, separating the excess liquid from said screen mesh and the gelatin, exposing and developing said screen, and then curing said screen by means of a glycerin solution.

15. The process of preparing a stenciling screen which comprises immersing a sheet of gelatin in an aqueous bath to soften it, immersing a screen mesh in said bath, laying said screen mesh in juxtaposition to said sheet, lifting said gelatin and said screen out of the bath, exposing and developing said screen, and then curing the resulting screen by an application of a glycerine solution.

16. The process of preparing a cured stenciling screen of predetermined thickness which comprises immersing a sheet of gelatin of uniform predetermined thickness in a liquid sensitizing solution, soaking the same until soft, juxtaposing in register to said sheet of gelatin a screen mesh, lifting said gelatin and said screen mesh in juxtaposition out of solution, brushing said resulting screen to obtain a smooth contact therebetween, causing said screen to dry, exposing and developing said screen, and then curing the screen by an application of an aqueous glycerine solution.

17. The process of preparing a cured stenciling screen of predetermined thickness which comprises immersing a sheet of gelatin of uniform predetermined thickness of from 16 to 20 thousandths of an inch in a liquid sensitizing solution, soaking the same until soft, juxtaposing in register to said sheet of gelatin a screen mesh of from #12 to #16 gauze weave, lifting said gelatin and said screen mesh in juxtaposition out of solution, brushing said resulting screen to obtain a smooth contact therebetween, causing said screen to dry, exposing and developing said screen, and then curing the screen by an application of an aqueous glycerine solution.

18. The process of preparing a cured stenciling screen of predetermined thickness which comprises immersing a sheet of gelatin of uniform predetermined thickness of from 16 to 20 thousandths of an inch in a liquid sensitizing solution, soaking the same until soft, juxtaposing in register to said sheet of gelatin a screen mesh of from #12 to #16 gauze weave, lifting said gelatin and said screen mesh in juxtaposition out of solution, brushing said resulting screen to obtain a smooth contact therebetween, causing said screen to dry, exposing the sensitized gelatin to the action of light in a predetermined pattern, dissolving and removing the portions of said gelatin unaffected by light, and then curing the resulting screen by an application of an aqueous glycerine solution.

HARRY E. PLAYFORD.
ROBERT H. HOGE.
CARROLL CONE.